Figure 3:
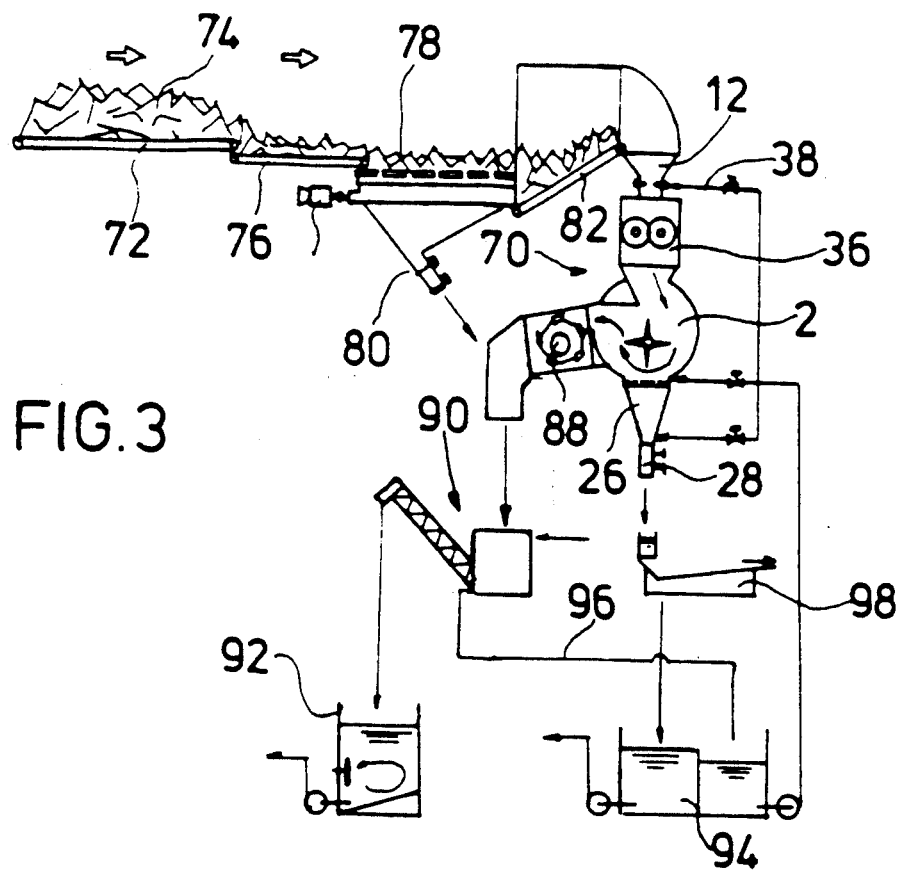

United States Patent [19]
Menges

[11] Patent Number: 5,193,753
[45] Date of Patent: Mar. 16, 1993

[54] APPARATUS FOR DISINTEGRATING FLEXIBLE PACKING MATERIALS

[75] Inventor: Wilhelm Menges, Brannenburg, Fed. Rep. of Germany

[73] Assignee: PWA Industriepapier GmbH, Fed. Rep. of Germany

[21] Appl. No.: 815,350

[22] Filed: Dec. 27, 1991

[30] Foreign Application Priority Data

Dec. 29, 1990 [DE] Fed. Rep. of Germany ....... 4042227

[51] Int. Cl.⁵ ...................... B02C 11/08; B02C 13/00
[52] U.S. Cl. ........................................ 241/43; 241/78
[58] Field of Search .................. 241/152.1, 157, 43, 241/227, 78

[56] References Cited

U.S. PATENT DOCUMENTS

| | | | |
|---|---|---|---|
| 1,967,313 | 7/1934 | Hohland-Letz | 241/43 |
| 2,789,903 | 4/1957 | Lukman et al. | 92/21 |
| 3,051,609 | 8/1962 | Grossman et al. | 162/5 |
| 3,226,343 | 12/1965 | Rhodes | 260/2.3 |
| 3,271,239 | 9/1966 | Hornbostel, Jr. | 162/169 |
| 3,284,282 | 11/1986 | Immel | 162/4 |
| 3,325,345 | 6/1967 | Hider | 162/169 |
| 3,408,255 | 10/1968 | Tatum | 162/5 |
| 3,574,050 | 4/1971 | Tenafly | 162/5 |
| 4,000,031 | 12/1976 | Acobas | 162/4 |
| 4,012,561 | 3/1977 | Doughty et al. | 428/531 |
| 4,111,730 | 9/1978 | Balatinecz | 156/62.2 |
| 4,188,259 | 2/1980 | Mamers et al. | 162/4 |
| 4,193,838 | 3/1980 | Kelly et al. | 162/5 |
| 5,084,135 | 1/1992 | Brooks et al. | 162/4 |

Primary Examiner—Douglas D. Watts
Attorney, Agent, or Firm—Marshall, O'Toole, Gerstein, Murray & Bicknell

[57] ABSTRACT

An apparatus is described for reprocessing, i.e. disintegrating, used packing materials, for example unsorted domestic waste paper. The apparatus consists essentially of a first comminuting aggregate (14), a following trough-like housing (2) with agitating mechanism (4, 6) rotating therein and a further comminuting aggregate (18) arranged in the material exit well (16). The apparatus is further provided at its lower end with a heavy trash collecting chamber (26). The comminuting aggregates (14 and 18) are replaceable and depending upon the working requirements selection is possible between purely cutting, more chopping or also disintegrating tools. The first comminuting aggregate (14) serves to comminute the largely sheet-like raw material to a conveyable piece size while the second comminuting aggregate (18) serves essentially for fine comminution and disintegration of the material. In the intermediate trough cleaning of the material can take place, and a rinsing liquid circulation can be employed via the connections (38, 34, 36 and 28). In this case low-density operation is provided. The apparatus can however also be operated in the high-density range and then a disintegration can start in the trough (2) itself. The material leaving the apparatus is prepared in such a manner that it can be separated into its components to be further treated by means of sieve sorting devices.

23 Claims, 2 Drawing Sheets

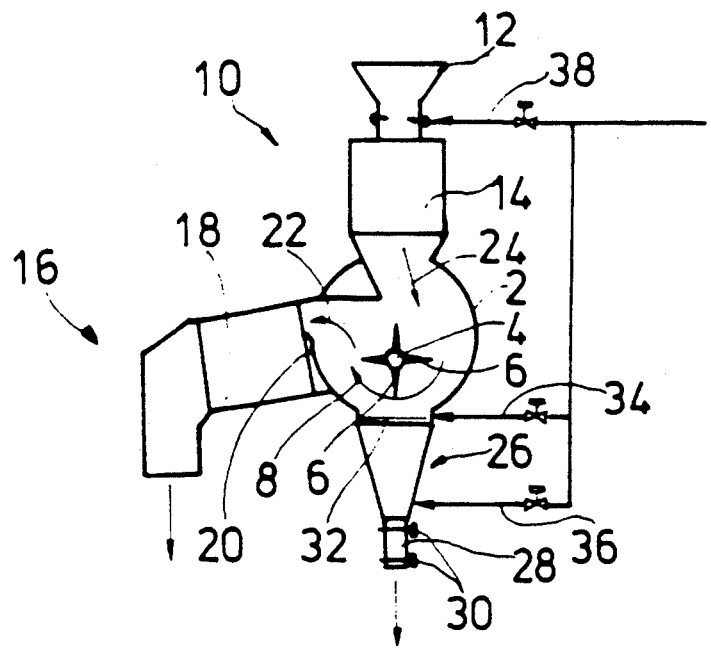
FIG.1
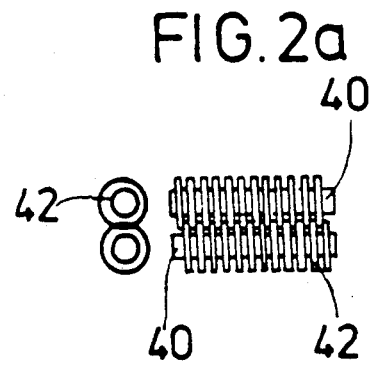
FIG.2a
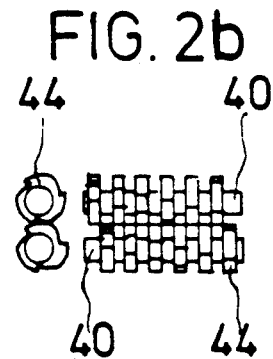
FIG.2b
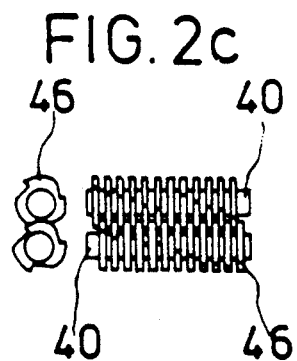
FIG.2c
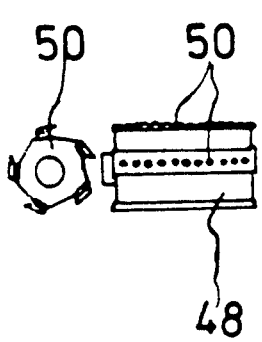
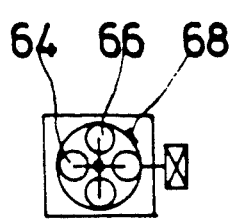
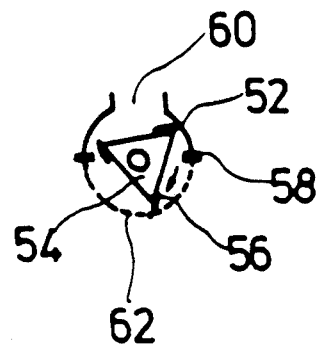
FIG.2d   FIG.2e   FIG.2f

APPARATUS FOR DISINTEGRATING FLEXIBLE PACKING MATERIALS

The invention relates to an apparatus for disintegrating flexible packing materials. The term "flexible packing materials" has been chosen to distinguish the materials concerned from rigid packing materials such as metal, wood, rigid plastic and the like. The materials which are meant within the scope of the invention are packing materials based essentially on paper materials such as paper, cardboard and paperboard as well as composite materials which consist of such a material in conjunction with a plastic foil or a foil coating. Relatively stiff cardboards and paperboards are also to be covered by the term "flexible". Although isolated plastic sheets or foils fundamentally belong to the packing materials concerned, the invention is however more concerned with mixtures which contain also at least paper-like components. The raw material meant here is essentially waste paper with all its greatly varied fractions and compositions.

Today, waste paper is used on a large scale in the papermaking industry as recycled raw material. However, the greater part thereof is socalled sorted waste paper which on its further disintegration generally does not present any particular problems. However, for environmental reasons and for reasons of economy in the use of raw materials, there is a need to process as far as possible all waste papers, including the waste materials arising in conventional waste paper processing, at least to such an extent that all the materials which can reasonably be used again are reemployed.

The waste paper disintegration takes place hitherto generally in a material disintegrator, a socalled pulper, which consists of a trough with an upper or lateral charging opening and at the bottom of which or at the side wall of which a driven impeller is located with the aid of which the waste paper introduced into the pulper is softened in aqueous suspension and dispersed into its fibrous constituents. A pulper for waste paper disintegration is generally provided with means with aid of which a major part of non-fibrous foreign materials can already be separated from the fibrous suspension.

In the turbulence of the pulper content large-area or elongated articles which cannot be broken down into fibres, for example wires, strings, rags, larger foil pieces and the like, spin themselves to form a socalled plait which slowly continues to form when it is withdrawn continuously form the pulper with low speed. Furthermore, at certain points of the pulper flow smaller plastic pieces and the like also tend to accumulate. They too can be largely withdrawn intermittently from the corresponding region of the pulper. Such foreign constituents are referred to as light trash. Further light trash also accumulates in the following sorting of the fibrous material.

Hitherto, all the foreign materials separated in the waste paper processing, i.e. socalled heavy trash which collects in a bottom trap of the pulper and may consist of stones, metal parts and the like, the aforementioned light trash and the plait were disposed with on a dump. It was only the fibrous materials, in so far as they can be separated from the material used with the conventionally generally employed methods, which were employed again as half stuff in paper making.

With the conventional pulper it is not possible to have access to all the fibrous materials contained in the waste paper, particularly when the substrate of plastic-laminated packing papers is involved and such a pulper is also unable to prepare the fraction referred to as trash from the point of view of paper making for recovering raw materials contained therein.

The invention is therefore based on the problem of providing an apparatus which overcomes the limitations of the conventional pulper and which in addition has an adaptability such that in accordance with requirements it is possible therewith to process different packing material sorts, mixed waste paper such as domestic refuse and packing materials separated from the conventional waste paper processing and substantially no longer containing fibrous material, to such an extent that a pumpable suspension is formed which can be subjected to a further defibration and/or fractionation into its various constituents. When in this application reference is made to disintegration or defibration, this means only the breaking down of the pulp constituents of the raw material into individual fibres. Plastic foils and sheets and the like can only be comminuted in conjunction therewith.

The problem defined above is solved according to the invention by an apparatus for disintegrating flexible packing materials comprising a trough-forming substantially closed housing at least one raw material supply well communicating with the housing interior, a first comminuting aggregate arranged in that at least one raw material supply well, at least one exit well communicating with the housing interior, a second comminuting aggregate arranged in the at least one exit well and a driven conveying member arranged in the housing interior, an overflow weir being provided between the housing and the exit well and essentially governing the liquid level in the housing.

It has been found that for processing the raw materials concerned here generally two different comminuting steps are necessary, the first comminuting step serving generally to make the material uniform in such a manner that it is pumpable or conveyable in the aqueous suspension itself, and the second step performs the task of dividing the material into small area particles in the range of 5–15 mm maximum diameter, preferably in the range of 8–12 mm maximum diameter, so that on the one hand by action of mechanical energy these small sheet pieces can also be subjected to a breaking down of the raw material into fibrous and plastic constituents and the suspension with particles of the order of magnitude indicated also becomes sortable by means of screens.

When reference is made in the present context to comminuting aggregates, the latter must exert not only a cutting or dividing function but also perform a sort of squashing and disintegrating function, this depending upon the tools selected for the specific case.

At least the second comminuting step takes place in aqueous suspension.

In accordance with the basic requirements set forth above, the apparatus according to the invention consists essentially of a trough-forming substantially closed housing. This is trough-forming because in the housing a certain amount of processed packing material is present in aqueous suspension and substantially closed so that on splashing of the suspension and the like the material is kept substantially within the apparatus. The housing is formed at least in its lower portion as a hollow cylindrical trough in which an externally driven conveying member moves. In the case of the horizontally cylindrical configuration of the housing the conveying member is preferably a rotatably driven shaft which extends parallel to the cylinder axis and is provided with radially projecting conveying and agitation elements. The latter may be simple arms or elements made in paddle form. The nature of the configuration of the conveying and agitation elements depends upon which suspension consistencies are to be employed in any particular case.

The apparatus is provided with a raw material supply well which extends generally from the upper side of the housing upwardly and in the path of which a first comminuting aggregate is arranged. The apparatus further comprises an exit well which preferably adjoins the housing laterally and in its further course is expediently downwardly angled or curved. A second comminuting aggregate is disposed in said exit well. Between the housing and exit well an overflow weir is provided which substantially governs the liquid level in the housing and via which the overflow suspension enters the exit well.

For the case in which the conveying member consists of a horizontal shaft with agitation arms, the raw material supply well is preferably so arranged that its exit opening is directed onto the side of the conveying member on which the agitation arms thereof are in downward movement.

Correspondingly, the exit well is preferably provided at the side of the housing on which the agitation arms are in upward movement. In this manner it is ensured that the raw material coming from the supply well is entrained by the agitation arms into the lower portion of the housing trough and is partially kept in circulation and the surfacing agitation arms carry already pretreated material up to the overflow weir so that the material is continuously passed into the second comminuting aggregate in the exit well.

The raw material supply well emerges above the first comminuting aggregate expediently into a feed hopper. In the region of this hopper, at least however above the first comminuting aggregate, liquid inlet tubes may be provided on the supply well. If for example contaminated beverage cardboard is being processed it may be desirable to add rinsing liquid, generally water, already at this point so that the rinsing off of residual previous package content from the packing material can take place at this point. When processing unsorted waste paper it may be desirable firstly to comminute the latter dry with the aid of the first comminuting aggregate, a liquid inlet connection on the supply well then being superfluous.

Generally, it is expedient to free the packing material to be processed before entry into the apparatus according to the invention from heavy trash such as stones, metal parts and the like, in order to avoid wear of the tools of the first comminuting aggregate. Since however this is not completely possible in all cases, at least the first comminuting aggregate should be made so robust that foreign bodies of the aforementioned type will not necessarily damage it. However, generally the second comminuting aggregate which performs the fine comminution is to be protected from such foreign constituents. For this purpose, in its lower region the apparatus according to the invention is expediently equipped with a heavy trash collecting chamber which is provided at its end with a lock through which collected heavy trash can be downwardly discharged from said chamber from time to time.

In particularly advantageous configuration, this heavy trash collecting chamber is formed as a sort of cyclone which extends downwardly from the lowermost region of the housing and the upper further opening of which forms the transitional cross-section to the housing of the apparatus whilst the lower pointed end of the cyclone can be provided with the heavy trash lock already mentioned. This configuration is expedient to ensure that utilizable constituents of the suspension do not settle in the heavy trash collecting chamber and then block the latter. It is therefore desirable to generate in the cyclone a downwardly directed helical flow and a central upwardly directed flow as is usual in apparatuses of this type. This is achieved in that at the upper wide end of the cyclone a tangential inflow connection for dilution liquid, generally water, is provided which is thereby brought into the helical flow and entrains suspension constituents out of the housing content. To maintain the central upward flow when the material in the cyclone possibly becomes thicker, it is expedient to provide at the bottom a further inflow connection for water which is intended to assist the upward flow. With this technical configuration it is ensured that on the one hand no utilizable raw material collects in the heavy trash collecting chamber and on the other hand the heavy trash settling is largely free from utilizable material.

For certain purposes, in the lower region of the housing or in the lower region of the heavy trash collecting chamber expediently a liquid withdrawal connection is also provided. If for example beverage package cardboard contaminated by contents is to be washed, it is appropriate to avoid the rinsing liquid entering the further processing circuit. Although the fresh rinsing liquid introduced at the supply well or at another point of the housing can be employed in the cycle to some extent, at a certain enrichment with contamination substances it is advisable to withdraw continuously part of the rinsing liquid from the system via the heavy trash collecting chamber and conduct it preferably to a biological clearing apparatus. Part of the rinsing liquid which leaves the apparatus with the processed raw material via the exit well is generally subsequently squeezed out of the material again and returned to the rinsing system of the apparatus.

In a preferred embodiment of the apparatus easy adaptability to different uses is achieved in that the comminuting aggregates are made as exchangeable constructional units which can easily be inserted into a corresponding receiving means in the respective well. The arrangement should ensure that the insertion of the comminuting aggregates takes place with good sealing from the outside. Since uses exist in which an aggregate generally provided as comminuting aggregate 2 may also be employed as comminuting aggregate 1, the receiving means in both wells should be formed in the same manner so that the comminuting aggregates may be exchanged between them. Tools which can be used in the comminuting aggregates are already known per se from other fields of use so that in the basic construction of these tools recourse may be had to known constructional elements. Depending on the purpose, cutting tools are required which for example can effect a pre-comminution of used beverage cardboard for the decontamination washing thereof, it being desirable for the cutting points of the bilaterally foil-coated material to be sealed as far as possible by the plastic material of the foils so that the rinsing agent, at least at this point of time, cannot yet penetrate into the fibrous structure of the substrate. In contrast, in other cases it is desirable for the packing material to be more or less torn into smaller portions in the precomminution in the comminuting aggregate 1. The comminuting aggregate 2 is intended to ensure a fine comminution and to exert as far as possible at the same time a squeezing and disintegrating effect on the small pieces obtained. The comminuting aggregate 2 is in any case provided on the exit side with a sieve plate or the like which ensures that only constituents of adequate fineness can finally leave the comminuting aggregate whilst constituents which are not yet small enough are further processed in the cycle in the aggregate itself.

For example, comminuting aggregates which can be employed within the scope of the invention may be constructed in such a manner that they have two rotating tool carrier shafts extending transversely of the passage direction of the material and equipped with offset tool elements which come into engagement alternately with those of the adjacent shaft. For a purely cutting action the tool elements may consist of rotating circular blades which are each in engagement with a respective counter blade of the adjacent shaft. The spacing of the blades essentially governs the size of the pieces obtained. The shafts rotate expediently in such a manner that the movement directions of their tool elements at the material entrance side of the comminuting aggregate are pointed towards each other so that the two tool shafts form an entrance nip into which the material to be comminuted is automatically drawn.

For a more tearing effect a similar arrangement may be used in which however the alternately interengaging tools are not blades closed at their periphery but have a series of chopping blades distributed over the periphery as are used in similar manner also for cutting up wood.

For the fine comminution and disintegrating effect in the comminuting aggregate 2 a tool carrier may be employed which rotates about a transverse axis and which is provided on an imaginary cylindrical surface with cutting and/or more crushing tool elements which each cooperate with respective counter elements at the inner wall of correspondingly cylindrically shaped housing portions of the aggregate. Since the outlet of such an aggregate is closed by a sieve allowing only adequately small particles to pass, the tools of the tool carrier entrain the material in the peripheral orbit until said material has been adequately comminuted.

Should the apparatus according to the invention be intended for further processing waste materials from a conventional waste paper pulping plant, in a specially equipped apparatus a comminuting aggregate 1 may be provided which has tools which by rotating blades cut the plant withdrawn from the pulper and introduced slowly into the apparatus according to the invention into small pieces. Since the plait when processing waste paper bale goods generally also contains the binding wires of the bales, in this case the tool must be constructed robust enough to enable it to cut up these constituents as well and they can then be removed from the apparatus again via the heavy trash collecting chamber. Such a plait cutter consists for example of a rotating disc saw with sharpening means. The material to be cut is held at the instant of cutting by converging half dishes. After the cutting they open and permit the ejection of the section and the further unobstructed slow entry of the plait. In the further processing of the plait it may be expedient to use two apparatuses according to the invention in cascade, the first serving for comminuting and further disintegration of the plait material and the plait material thus preprocessed being supplied together with the remaining light trash collected out of the paper processing of the following apparatus.

Fundamentally, it is also possible to amplify the apparatus according to the invention by providing subcomponents thereof several times. It would for example be possible to provide an apparatus having two raw material supply wells, one of which is provided for example especially for the comminution of a plate whilst the other can be provided for the precomminution of another material component, if it is possible then to bring the two pretreated components together in the housing trough.

With the fundamental method sequence taking place therein and the possibility of selecting tools in accordance with the particular requirements, the apparatus described provides an optimum instrument for solving the problem set. Excessive comminution of the starting material is generally undesirable because by increasing cuts the number of paper fibres shortened by the cuts increases and as a result the recovered pulp has shorter fibres and thus loses positive use properties. On the other hand, a certain minimum comminution is essential in order firstly to detach plastic layers from the fibrous substrate and secondly to transform the suspension obtained into a state in which as far as possible a fine sorting thereof can be carried out.

Figure 4:
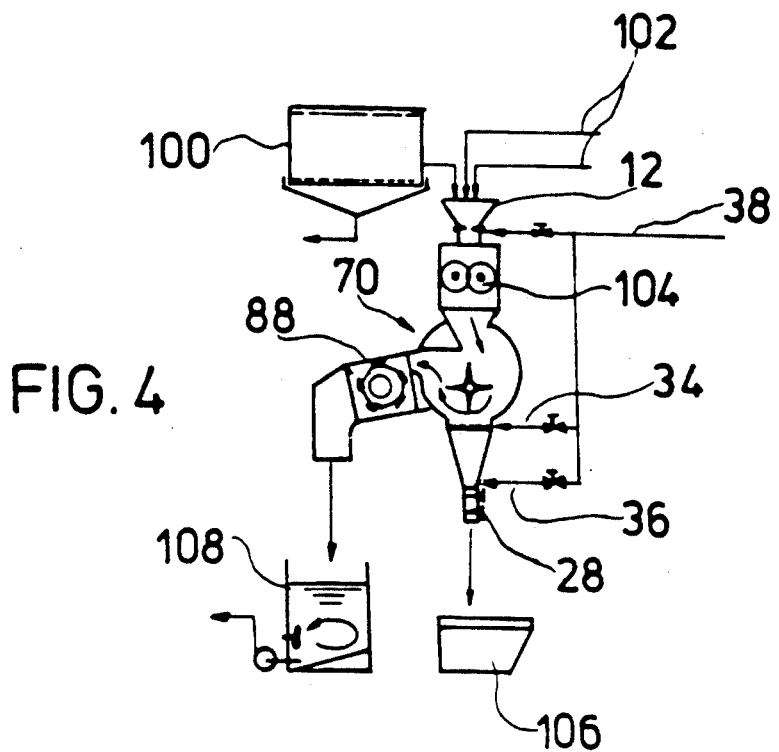

Hereinafter the invention will be explained in further detail with the aid of the attached drawings, wherein:

FIG. 1 is a schematic plan view of an apparatus for disintegrating flexible packing materials, FIGS. 2a-f show possible embodiments for the comminuting aggregates which can be used in the apparatus according to FIG. 1, FIG. 3 shows part of a method scheme for a first application of the apparatus according to FIG. 1 and FIG. 4 shows part of a method scheme for a further example of the use of the apparatus according to FIG. 1.

FIG. 1 shows a schematic plan view of an apparatus for disintegrating flexible packing materials. This apparatus comprises an essentially cylindrical basic housing 2 which is shown as a circle in the plan view of FIG. 1 and extends in the direction of its cylinder axis into the plane of the drawing. In the housing 2 a rotatably driven shaft 4 is disposed which extends parallel to the cylinder axis of the housing but is arranged somewhat beneath the centre axis of the housing. The shaft 4 is provided with radial agitating arms 6. The direction of rotation of this conveying and agitating element consisting of shaft 4 and agitating arms 6 is indicated by an arrow 8.

A raw material supply well 10 extends upwardly from the upper side of the housing 2 and is provided at its upper end with a raw material feed hopper 12. As indicated by the square 14, in the raw material supply well 10 an insert receiving means is provided for a first comminuting aggregate which is not illustrated in FIG. 1. With respect to the illustration of FIG. 1 an exit well 16 adjoins the basic housing 2 laterally on the left and initially extends only somewhat downwardly inclined but is then downwardly directed by means of an elbow piece. As indicated by the rectangle 18 the exit well 16 contains an insert receiving means for a further comminuting aggregate which is likewise not shown in detail in FIG. 1. It should be observed that the housing 2 is provided in the connection region of the exit well 16 with a weir-like overflow edge 20 which governs the possible liquid level in the housing. Excess amounts of liquid or suspension flow over this overflow edge 20 into the exit well 16 and thus to the second comminuting aggregate 18. The flow direction is indicated here by an arrow 22. The raw material supply well 10 is aligned with its lower boundary walls in such a manner that material emerging from the first comminuting aggregate 14 passes along the arrow 24 as far as possible into the region of the housing 2 in which the agitating arms 6 are in downward motion.

The lower portion of the basic housing 2 is followed by a heavy trash collecting chamber 26 which is made cyclone-like, i.e. tapered downwardly. This heavy trash chamber 26 is provided at its lower end with an exit tube 28 which comprises two lock slides 30 arranged in series so that said tube section can be used as lock for periodic discharge of heavy trash collecting in the collecting chamber 26. At its upper entrance the heavy trash collecting chamber is closed by a sieve 32 which permits comminuted heavy trash as well as disintegrated fibrous material to move into the heavy trash collecting chamber, coarse raw material parts being however retained by the sieve 32 and therefore remaining in the material cycle generated by the agitating mechanism 4, 6.

However, to avoid the heavy material collecting chamber 26 from being slowly filled up with fibrous material or other material, it is operated in the form of a cyclone, i.e. a turbulence sifter. For this purpose, in the upper region of the collecting chamber a tangential liquid inlet is provided so that by liquid supplied at the outer wall of the heavy trash collecting chamber a conically downwardly tapering helical turbulence flow can be generated which in the lower region of the chamber reverses and flows centrally upwards again. To assist such a flow reversal, in the lower region of the heavy trash collecting chamber 26 a further liquid inlet 36 is provided. The exit tube 28 of the heavy trash collecting chamber 26 with its two slides 30 can also serve for continuous or intermittent partial withdrawal of contaminated rinsing liquid from the apparatus.

The amount of liquid added in the tangential liquid inlet 34 and in the lower liquid inlet 36 serves simultaneously as suspension water or cleaning water for the material processed. In the case where said material is to be worked moist or wet in the first comminuting aggregate 14 itself, the raw material supply well 10 is also provided with a liquid inlet 38. Said liquid inlet 38 may be constructed in such a manner that the rinsing liquid can be injected into the raw material supply well 10 radially from different sides.

The mode of operation of the apparatus is as follows: Via a conveyor belt or other feed means packing material to be disintegrated, essentially in the form of waste paper or the like, is introduced as continuously and as separated as possible into the raw material feed hopper 12. If the material is to be further processed moist or washed, water for example is additionally injected via the liquid inlet 38 into the raw material supply well 10. The material then moves through gravity into the first comminuting aggregate 14 into which it is additionally drawn by the rotation of the tools. In the first comminuting aggregate 14 the raw material is comminuted in such a manner that it can be circulated in aqueous suspension and further conveyed by the agitating means 4, 6. In the first comminuting aggregate 14 any heavy trash which might still be present in the raw material is generally freed and can then settle in the heavy trash collecting chamber 26, and therefore does not reach the second comminuting aggregate 18.

With adequate raw material and liquid supply, assisted by the agitating mechanism 4, 6, the raw material which is either washed or predispersed is thrown via the overflow edge 20 into the exit well 16 and there reaches the second comminuting aggregate 18. This second comminuting aggregate is usually a fine comminuting aggregate which additionally exerts a disintegrating effect on the material. The second comminuting aggregate 18 is closed at its exit side with a sieve of suitable mesh width so that only material which already has adequate fineness can pass through the exit of the second comminuting aggregate. Material which is too coarse is further processed in the second comminuting aggregate until it can pass the exit sieve. This exit sieve, depending on requirements, may have mesh widths between 5 and 15 mm but generally mesh widths in the region of 8 to 12 mm have proved suitable.

The raw material suspension emerging from the exit well 16 and processed in the apparatus can pass directly into a collecting vat or firstly into a suitable draining aggregate in which the raw material is freed from rinsing water, then passing to a collecting vat in concentrated form.

FIGS. 2a–b represent possible configurations of the tools which can be used in the comminuting aggregates, each in schematic side elevation and schematic end elevation.

FIG. 2 shows a purely cutting working tool. It can be seen from the side elevation that the cutting blades 42 arranged on the parallel shafts 40 engage alternately into each other. From the end elevation shown adjacent the side elevation it can be seen that the cutting blades 42 have a closed peripheral edge. Two oppositely disposed blade discs contact each other in their overlapping region and thus generate between them a shearing action.

FIG. 2b shows a working tool in which the parallel shafts 40 are equipped with chopping blades 44. This can readily be seen in the left end elevation. The working tool of FIG. 2c is a similar construction to that of FIG. 2b but on the shafts 40 there are a greater number of thinner chopping blades 46 which all together perform a higher degree of comminution.

FIG. 2d represents a working tool which is suitable for fine comminution and simultaneously disintegration. As apparent from FIG. 2, in this case only a single tool carrier 48 is provided which is equipped along cylindrical generatrices with tools 50, the configuration of which can be seen better in the left end elevation. These tools 50 cooperate with counter tools which are formed on the inner surface of a corresponding housing (not shown in FIG. 2d). A similar embodiment is shown basically in FIG. 2f. In this case a housing 52 can be seen in which a tool carrier 54 is rotatably disposed which is equipped with three rows of tools 56 which cooperate with counter tools 58 on the housing 52. In the comminuting aggregate illustrated in FIG. 2f a material supply opening 60 can also be seen at the top whilst the housing 52 is closed at the lower side by a curved sieve plate 62. Only adequately comminuted material can leave the aggregate through said sieve plate 62 and coarser constituents are further processed in the comminuting aggregate until they have also reached a fineness adequate to pass through the sieve.

A particular comminuting apparatus is illustrated in FIG. 2b. This is a plait cutter. At the left a plait tube 64 in which the plait is guided can be seen whilst at the right three disc saws 66 rotatable about an axis are provided which can be moved consecutively through an interruption (not shown) in the plait tube in order to successively sever pieces from the plait hanging in the plait tube 64. On their return the disc saws 66 are adapted to move past a sharpening means 68. This schematic illustration is intended to show only one possibility of the configuration of such a tool.

In FIG. 3 a first example is given for the use of the apparatus described above for the disintegration of packing materials. This is a subplant for reprocessing used beverage cardboard coated with foil on both sides.

The disintegration apparatus provided with the reference numeral 72 can be seen as central unit. Used beverage cardboard 74 is placed loosely on a first conveyor belt 72. A subsequent conveyor belt 76 runs with elevated speed in order to thin out the continuous stream of beverage cardboard, i.e. to single out the beverage cartons as far as possible. This stream of raw material then runs via a vibrating sieve 78 with the aid of which as far as possible heavy trash, such as stones, metal parts and the like, is separated from the raw material. This heavy trash can then be removed from the system via a lock 80.

The material thus freed from heavy trash is then conveyed via a third conveyor belt 82 into the feed hopper 12 of the apparatus 70. Smaller cardboard pieces which pass with the heavy trash through the vibrating sieve 78 can be returned by means of a fan 84 to the beverage cardboard to be further processed in the region of the conveyor belt 82.

The first comminuting aggregate 86 provided in the apparatus 70 is one which exerts only a cutting function in order to cut the beverage cardboard into pieces of about 5 cm in size which can be flushed in the cleaning. In front of the first comminuting aggregate 86 rinsing liquid, generally only water, is introduced into the system via the liquid inlet 38 so that a washing effect occurs already in the first comminution of the raw material. The washing of the raw material is then completed in the housing 2 of the apparatus, after which the raw material passes into the second comminuting aggregate 88 which is constructed as fine comminutor with simultaneous disintegrating action. The disintegrated raw material then passes into a drainer in which it is largely freed from rinsing liquid and thus thickened. The thickened material finally passes into an agitating vat 92 from whence it can be sent to the further processing.

The rinsing water from the drainer 90, separated from the material, then passes via a conduit 96 in to the right part of a divided water vat 94, from whence it is used again as rinsing liquid in the apparatus 70. From the lower tube 28 of the apparatus 70 part of the rinsing liquid is continuously withdrawn together with the heavy trash collecting there. The heavy trash is collected on a sieve means 98 and the withdrawn rinsing water passes into the left portion of the divided water vat 94, from whence a fraction thereof is continuously supplied to the works clarifying tank.

In the use described above the apparatus 70 can be operated only in the low-density range because in the housing 2 of the apparatus only a washing of the packing material cuttings takes place. The fine comminution and disintegration does not start until the comminuting aggregate 2 and the disintegration is then further completed in the following agitating vat.

In this case within the scope of the development work, as comminuting aggregate 2 a washing/cutting granulator CS500/1000IIIa of the company Condux of Hanau was employed, the tools of which are for example suitable for the method step carried out here.

FIG. 4 shows a use in which the apparatus 70 is employed only to process waste materials which collect in the sorting in a conventional waste paper processing plant. The light trash collecting from the pulper of the waste paper processing plant is drained in a sieve drum 100 and supplied to the feed hopper of the apparatus 70. At the same time, the light trash from the waste paper processing which collects in the fibrous material sorting stages is also introduced into the feed hopper 12. This raw material supply is indicated by the lines 102. The first comminuting aggregate 104 provided here is one which performs more of a chopping function and corresponds to that according to FIG. 2c. In tests, the tools of the "Refuse Shark Type CAH200/400" of the Condux company of Hanau were successfully employed. A previous moistening of the raw material via the water connection 38 is not necessary in this case because the material is already moist when it reaches the apparatus 70. Only diluting water is introduced into the apparatus via the connections 34 and 36. In this case water withdrawal via the tube piece 28 is also dispensed with because there is no need to carry out a washing operation on the material. Only heavy trash is withdrawn from time to time via the tube piece 28 and passes to a dump container 106. The second comminuting aggregate 88 is constructed similarly to the example of FIG. 3. The processed material passes from the apparatus 70 into an agitating vat 108 from which it can be supplied to the further processing.

Depending on the use, the apparatus 70 can be operated in the low-density or in the high-density range. In the low-density range the suspension treated still has a genuinely liquid character whilst in the high-density range it already has a highly pasty character. Working in the high-density range promotes disintegration of the material but is not possible when a washing or detaching operation is to be carried out.

The apparatus described is extremely versatile in use. Thus, depending on the raw material to be processed various treatment steps are possible. These include cutting comminution, disintegration, fine comminution, washing of the raw material, dissolving and detaching of adhesives and the like, the operations being possible without but also with addition of assisting chemicals.

For an effective operation of the apparatus described it is important that the material to be processed is supplied to the apparatus not in batches but as far as possible in a continuous well proportioned stream. This leads not only to a more intensive and better processing of the material but at the same time also makes it possible to reduce the energy consumption of the apparatus.

In its preferred embodiment the apparatus described is extremely easy to repair and maintain in particular due to the exchangeable comminuting aggregates. Since the contaminations contained in the raw material to be processed are not completely controllable before entrance of the material into the apparatus, the comminuting aggregates may possibly be subjected to a very high wear. It is therefore important for untroubled operation to be able to replace the aggregates rapidly by spare aggregates.

The apparatus claimed is also considered to come under the invention when it is operated with only one of its comminuting aggregates. Accordingly, an apparatus which from the start is intended only for one of the comminuting aggregates is also to come under the invention.

I claim:

1. Apparatus for disintegrating flexible packing materials comprising
    a through-forming substantially closed housing (2) adapted to contain a liquid suspension of partially comminuted packing materials,
    at least one raw material supply wheel (10) communicating with the interior of said housing,
    a first comminuting aggregate (14) disposed in said raw material supply well (10),
    at least one exit well (16) communicating with the interior of said housing,
    a second comminuting aggregate (18) disposed in said exit well (16), and
    a driven conveying member (4, 6) disposed in the interior of said housing,
    an overflow weir (20) being provided between the housing (2) and the exit well (16) and essentially governing the liquid level of said suspension in the housing (2).

2. Apparatus according to claim 1, characterized in that the housing (2) is formed at least in its lower region as a substantially cylindrical drum with horizontal cylinder axis.

3. Apparatus according to claim 2, characterized in that the conveying member (4, 6) has a shaft (4) which is rotatable about a horizontal axis and which is equipped with substantially radial conveying and agitating elements (6).

4. Apparatus according to claim 1, characterized in that the raw material supply well (10) is disposed in the upper region of the housing (2).

5. Apparatus according to claim 4, characterized in that the exit well (16) is disposed laterally on the housing (2).

6. Apparatus according to claim 4, characterized in that the lower end of the raw material supply well (10) is directed toward the radial elements (6) of the conveying member (4, 6) directed in downward motion.

7. Apparatus according to claim 6, characterized in that the exit well (16) is disposed at the side of the housing (2) at which the radial elements (6) of the conveying member (4, 6) are directed in upward motion.

8. Apparatus according to claim 1, characterized in that at the raw material supply well (10) liquid addition means (38) are provided.

9. Apparatus according to claim 8, characterized in that the liquid addition means (38) are disposed above the first comminuting aggregate (14).

10. Apparatus according to claim 1, characterized in that the lower region of the housing (2) is followed by a heavy trash collecting chamber (26).

11. Apparatus according to claim 10, characterized in that the heavy trash collecting chamber (26) is provided with a heavy trash discharge lock means (28).

12. Apparatus according to claim 1, characterized in that in the lower region of the housing (2), a liquid withdrawal tube is provided.

13. Apparatus according to claim 10, characterized in that the heavy trash collecting chamber (26) is formed as a cyclone adjoining the lower side of the housing (2).

14. Apparatus according to claim 13, characterized in that in the upper region of the cyclone a tangential liquid inlet (34) is provided.

15. Apparatus according to claim 13, characterized in that in the lower region of the cyclone a connection (36) is provided for rinsing liquid.

16. Apparatus according to claim 1, characterized in that the comminuting aggregates are formed as exchangeable insert units which are adapted to be inserted in corresponding receiving means (14, 18) in the raw material supply well (10) and in the exit well (16) respectively.

17. Apparatus according to claim 1, characterized in that in the exit well (16) a sieve (62) is disposed below the second comminuting aggregate.

18. Apparatus according to claim 17, characterized in that the sieve (62) has selectively mesh widths of 8 to 15 mm.

19. Apparatus according to claim 1, characterized in that at least one of the first and the second comminuting aggregate comprises two tool shafts (40) which extend transversely of the respective well and which are provided with alternately interengaging rotating tools (42, 44, 46).

20. Apparatus according to claim 19, characterized in that the tools are disc blades (42) in mutual engagement with each other.

21. Apparatus according to claim 20, characterized in that the tools are alternately interengaging chopping or tearing tools (44, 46).

22. Apparatus according to claim 1, characterized in that at least one of the first and the second comminuting aggregate comprises a tool carrier (48) which is rotatable about an axis extending transversely of the respective well and which is provided along an imaginary cylindrical surface with cutting and/or crushing tools (50, 56) which cooperate with corresponding stationary counter tools (58) which are arranged at the inner surface of an aggregate housing (52) at least partially surrounding the tool carrier (48).

23. The apparatus according to claim 12 wherein said liquid withdrawal tube is provided at a heavy trash collecting chamber (26) communicating with the lower region of said housing (2).

* * * * *